United States Patent
Price

(10) Patent No.: US 8,738,390 B1
(45) Date of Patent: *May 27, 2014

(54) FACILITATING APPROVAL OR DISAPPROVAL OF INDIVIDUAL SEGMENTS OF CONTENT

(75) Inventor: Roy F. Price, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 304 days.

This patent is subject to a terminal disclaimer.

(21) Appl. No.: 13/043,326

(22) Filed: Mar. 8, 2011

(51) Int. Cl.
| G06Q 30/02 | (2012.01) |
| G06Q 10/10 | (2012.01) |
| G06Q 10/06 | (2012.01) |
| G06Q 30/06 | (2012.01) |
| G06Q 10/08 | (2012.01) |

(52) U.S. Cl.
CPC .................................. *G06Q 10/067* (2013.01)
USPC ........................................................ 705/1.1

(58) Field of Classification Search
None
See application file for complete search history.

(56) References Cited

U.S. PATENT DOCUMENTS

| 2005/0034071 A1* | 2/2005 | Musgrove et al. ............ 715/530 |
| 2008/0109232 A1* | 5/2008 | Musgrove et al. ................ 705/1 |
| 2008/0235721 A1* | 9/2008 | Ismail et al. .................... 725/16 |
| 2008/0262906 A1* | 10/2008 | Pamell et al. ................... 705/12 |
| 2011/0225203 A1* | 9/2011 | Hart-Davidson et al. ..... 707/792 |

OTHER PUBLICATIONS

Office action for U.S. Appl. No. 13/043,294, mailed on Mar. 15, 2013, Price, "Identifying Individually Approved and Disapproved Segments of Content", 10 pages.

Office action for U.S. Appl. No. 13/043,294, mailed on Jul. 3, 2013, Price, "Identifying Individually Approved and Disapproved Segments of Content", 10 pages.

* cited by examiner

*Primary Examiner* — Jonathan Ouellette
(74) *Attorney, Agent, or Firm* — Lee & Hayes, PLLC

(57) ABSTRACT

Techniques described herein facilitate approval or disapproval of individual segments found within discrete pieces of content. By facilitating approval or disapproval on a per-segment basis, the described techniques allow for more granular feedback to the pieces of content than do traditional techniques. Furthermore, by indicating instances where individual segments receive broad approval or broad disapproval, the described techniques allow for better understanding of which individual segments of the content have been broadly deemed helpful and which individual have been broadly deemed unhelpful. This level of granularity contrasts with traditional techniques that simply indicate approval or disapproval of a piece of content in its entirety.

23 Claims, 15 Drawing Sheets

FACILITATING APPROVAL OR DISAPPROVAL OF INDIVIDUAL SEGMENTS OF CONTENT

BACKGROUND

Companies utilizing network-accessible sites (e.g., websites, intranets, etc.) continually strive to make their sites more dynamic, compelling, and easier for users to use. For instance, e-commerce websites may strive to make it easier for customers to locate, learn about, and purchase or otherwise acquire items. To help achieve this and other goals, these companies typically allow customers to upload reviews of items that users acquired via the site. That is, a customer who has purchased a certain item may create and upload a review of that item, whether the review is positive, negative, or neutral. These uploaded reviews may be helpful to other customers who are considering acquiring the reviewed item. In addition to providing a platform for such item reviews, these companies continue to seek ways to improve customer experiences.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
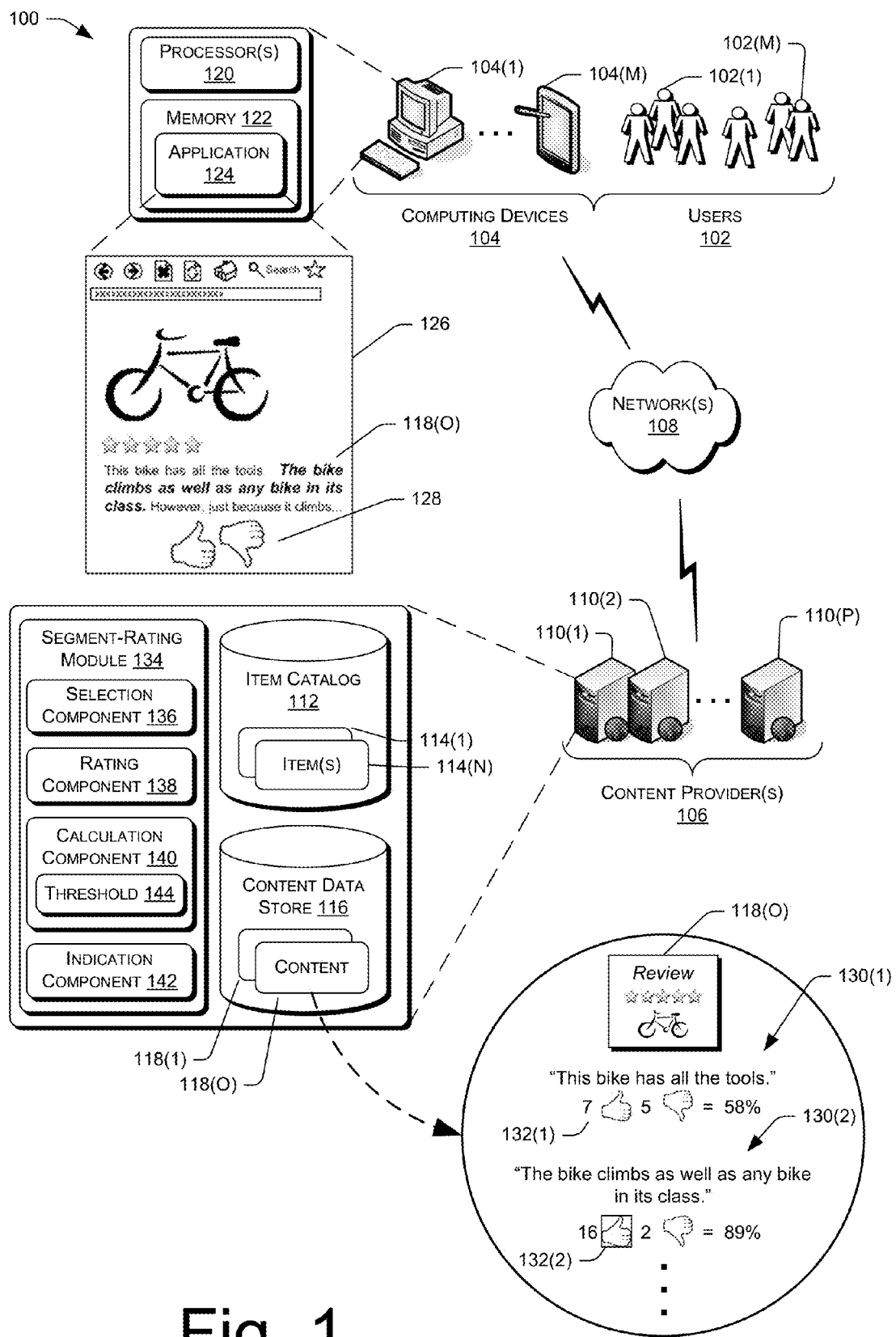
FIG. 1 is a schematic diagram of an example architecture for enabling users to provide ratings to individual segments of discrete pieces of content. In this example, users are able to express approval or disapproval of individual segments of customer reviews pertaining to items from an item catalog.

This disclosure describes, in part, facilitating approval or disapproval of individual segments of discrete pieces of content. By facilitating approval or disapproval on a per-segment basis, the techniques described below allow users to provide more granular feedback to the pieces of content as compared to the traditional techniques described above. Furthermore, by indicating instances where individual segments receive broad approval or broad disapproval, the described techniques allow for better understanding of which individual segments of the content have been broadly deemed helpful and which individual segments have been broadly deemed unhelpful. This level of granularity contrasts with traditional techniques that simply indicate approval or disapproval of a piece of content in its entirety.

For example, the techniques described below may allow users to express approval and/or disapproval of individual segments found within multiple different types of discrete pieces of content. A central service may aggregate each user approval/disapproval associated with the individual segments to determine whether the aggregated approvals/disapprovals exceed a certain threshold. When the central service determines that the aggregated approvals/disapprovals exceed the corresponding threshold, the central service may indicate the approval or the disapproval of the corresponding segment when providing the associated piece of content to users that subsequently request this content.

In one example, for instance, the piece of content comprises a corpus of text. Users may select individual segments of the corpus (e.g., individual words, phrases, sentences, paragraphs, etc.) and may express an approval (i.e., positive feedback) or disapproval (i.e., negative feedback) of a selected individual segment. The users may express approval or disapproval in any way. For instance, the users may select a thumbs up icon, a thumbs down icon, a "like" icon, a "dislike" icon, or may be able to rate an individual segment at a finer level of granularity. For instance, the techniques described herein may allow the users to rate individual segments from one star to five stars (where one star denotes strong disapproval and five stars denote strong approval) or by otherwise rating individual segments on a scale of any other granularity. Regardless of how the users submit their approval and/or disapproval, the central service may store each approval and disapproval in association with the particular segment that the user has rated.

To illustrate, envision the central service provides a corpus of text and a selectable icon that allows users to select particular portions of the text and express approval or disapproval of the particular portions. In this example, envision also that the central service receives and stores indications that eight users have expressed approval of a particular sentence, while only two users have expressed disapproval. The central service may then compare the aggregated statistics for this sentence to a predefined threshold to determine whether or not to indicate an approval or disapproval of this sentence.

For instance, the central service may be configured with a rule that states that the service will indicate an approval when a particular segment has received at least five approvals and at least 75% of the received ratings are approvals. Similarly, the service may be configured with a rule that states that the service will indicate disapproval when a particular segment has received at least five disapprovals and at least 75% of the received ratings are disapprovals. In this example, because the example sentence has receive more than five approvals (here, eight), and because the total approval percentage of received ratings is at least 75% (here, 80%), the central service will indicate community approval of the sentence.

As such, when a user requests the example corpus of text, the central service will serve the corpus along with an indication indicating the approval of the example sentence. The central service may indicate this approval in any way, such as visually, audibly, tactilely, and the like. For instance, the service may provide an icon indicating the approval adjacent the sentence, or the indication may be integral with the sentence itself. For instance, the sentence may indicate the approval by having a particular color (e.g., green) that is different that a default color of the corpus, by having a size that is different than a default size, by having a font type or style that is different than a default font type or style, or the like. In one of many examples, the central service may indicate "approved segments" in green font and "disapproved segments" in red font. Of course, while a few examples have been listed, the service may indicate approval and/or disapproval in any number of ways.

The techniques described herein may allow users to provide feedback to any sort of discrete pieces of content, such as discrete pieces of text, audio files, video files, animations, and/or any other type of content. In a few of many examples, the discrete pieces of content comprise user-uploaded reviews of items in an electronic catalog, articles that are accessible via a website (e.g., news articles, etc.), user statuses on social network sites, videos, songs, and the like. In one particular example, a merchant such as an e-commerce merchant may apply the techniques to customer reviews of items. By doing so, the merchant allows users to provide feedback to individual segments of the reviews, which helps users understand which portions of the reviews that the community broadly approves and which portions of the reviews that the community broadly disapproves. This additional understanding, in turn, helps users to better understand the item to which the reviews pertain.

For purposes of discussion, techniques for facilitating per-segment approval or disapproval are described in the example architecture. However, it should be appreciated that the described techniques may be implemented in multiple other architectures and environments.

Example Architecture

FIG. 1 is a schematic diagram of an example architecture 100 for enabling users 102(1), ..., 102(M) (collectively 102) operating respective computing devices 104(1), ..., 104(M) (collectively 104) to provide ratings to individual segments of discrete pieces of content. In this example, the users 102 are able to express approval or disapproval of individual segments of customer reviews pertaining to items from an electronic catalog. As described above, however, these techniques apply to any sort of visual and/or audible content.

Within the architecture 100, the users 102 may operate the computing devices 104 to access one or more content providers 106 via a network 108. While illustrated as a personal computer and a personal digital assistant (PDA), these computing devices 104 may be implemented as any number of other types of computing devices. These devices may include, for instance, PCs, laptop computers, PDAs, mobile phones, set-top boxes, game consoles, electronic book readers, and so forth. The network 108, meanwhile, represents any one or combination of multiple different types of networks, such as cable networks, the Internet, private intranets, wireless networks, and the like. Again, while FIG. 1 illustrates the devices 104 communicating with the content providers 106 over the network 108, the techniques may apply in any other networked or non-networked architectures.

One or more servers 110(1), ..., 110(P) (collectively 110), perhaps arranged in a cluster or as a server farm, may host the example content provider 106. Other server architectures may also be used to host the provider 106. In the illustrated implementation, the servers 110 are shown to include multiple modules and components, which may run as software on the web servers themselves. The illustrated modules may be stored in memory (e.g., volatile and/or nonvolatile memory, removable and/or non-removable media, and the like), which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. While FIG. 1 illustrates the servers 110 as containing the illustrated modules, these modules and their corresponding functionality may be spread amongst multiple other actors, each of whom may or may not be related to the content provider 106.

In some instances, the content provider 106 comprises a site (e.g., a website) that is capable of handling requests from many users and serving, in response, various pages (e.g., web pages) that can be rendered at the computing devices 104. For instance, the site can be any type of site that supports user interaction, including online retailers, informational sites, social networking sites, blog sites, search engine sites, news and entertainment sites, and so forth. In another example, the content provider 106 provides an application for the computing devices 104 to download, store, and run locally. The content provider 106 may additionally or alternatively interact with the devices 104 or provide content to the devices 104 in any other way.

In this example, the site of the content provider 106 represents a merchant website that hosts an item catalog 112 that stores one or more items 114(1), 114(2), ..., 114(N) (collectively 114) and/or information regarding the items 114. An item includes anything that the merchant wishes to offer for purchase, rental, licensing, subscription, viewing, informative purposes, or some other form of consumption. In some embodiments, the item may be offered by the merchant for consumption. However, in some other embodiments, the merchant may host items that others are selling using the merchant's website. An item can include a product, a service, a discussion forum, a digital download, a news clip, user-created content, information, or some other type of sellable or non-sellable unit.

While the item catalog 112 may store some items, the catalog 112 may additional or alternatively store item records. The items records represent information regarding associated items being offered for sale or another form of consumption. For products such as books or music CDs, for example, the item record may contain a description, images of the product, author/artist names, publication data, pricing, shipping information, and so forth. For other types of items, the item record may contain different information appropriate for those items. Hereafter, the term "item" may be used interchangeably with the term "item record".

When a user requests information about an item from the content provider 106, the servers 110 retrieve the item information from the item catalog 112 and serve the information (e.g., via a web page) to the computing device of the requesting user. The item catalog 112 may therefore contain static pages that are pre-generated and stored prior to such requests, or may alternatively store data that is used to populate dynamic pages that are generated in response to such requests.

The servers 110 may further store, or have access to, a content data store 116 that includes one or more discrete pieces of content 118(1), . . . , 118(O) (collectively 118). The pieces of content 118 may comprise any sort of content, such as content provided in whole or in part by the users 102. For instance, the content 118 may include customer reviews of an item within the item catalog 112. FIG. 1 illustrates, for example, that the example piece of content 118(O) comprises a particular customer review for a particular bicycle stored in the item catalog 112. In some instances, the users 102 may utilize the computing devices 104 to upload and/or access the information stored in the item catalog 112 and the content data store 116

In FIG. 1, for instance, the example user 102(1) may utilize the example computing device 104(1) to request information associated with the bicycle that is the subject of the piece of content 118(O) (or "customer review 118(O)"). For instance, the user 102(1) may request an item detail page associated with the bicycle, may request a customer review page that includes one or more reviews for the bicycle, or the like.

In the illustrated example, the computing device comprises one or more processors 120 and memory 122, which stores an application 124 (e.g., a browser, etc.) that communicates with the content provider 106 over the network 108. Here, the user 102(1) requests, and the content provider 106 serves, a user interface (UI) 126 that includes the customer review 118(O) of the bicycle along with an icon 128 that is selectable by the user 102(1) to provide an approval or disapproval of individual segments of the customer review 118(O). For instance, the user 102(1) may select a particular word, sentence, or other portion of the customer review 118(O) and may select the thumbs-up icon to express approval of that portion of the review, or may select the thumbs-down icon to express disapproval of the portion.

In addition, the customer review 118(O) within the UI 126 may indicate where one or more other users have expressed a prior approval or disapproval of individual segments of the review 118(O). In the illustrated example, for instance, the UI 126 illustrates (via bold, italicized, oversized lettering) that the segment "[t]he bike climbs as well as any bike in its class" has received prior approval from one or more users. For instance, a threshold number of users and/or a threshold ratio of users casting a vote may have previously selected the thumbs-up portion of the icon 128, indicating their respective approval of that particular segment of the review 118(O). As such, when the user 102(1) requested the UI 126 that includes the review 118(O), the content provider 106 provided the review 118(O) along with the indication. While the approval in this example is indicated by bold, italicized, oversized lettering, approvals and disapprovals may be indicated in any other manner in other embodiments.

The bottom-right portion of FIG. 1 illustrates information associated with the customer review 118(O) in greater detail. As illustrated, the example customer review 118(O) comprises multiple segments 130(1), 130(2), . . . , 130(S). While each of these segments comprises an individual sentence, these segments may comprise a word, a paragraph, or text of any or length of combination of lengths. In this example, FIG. 1 illustrates two example segments of the customer 118(O), a first segment 130(1) ("This bike has all the tools") and a second segment 130(2) (The bike climbs as well as any bike in its class").

In addition to illustrated the example segments, FIG. 1 illustrates that each of the segments may be associated with respective statistics indicating approval or disapproval of the corresponding segments from the user community 102. In this example, the first segment 130(1), for instance, is associated with statistics 132(1), which indicate that the segment 130(1) has received seven approvals (or "thumbs up") and five disapprovals (or "thumbs down"). An approval may indicate that a user generally agreed with the segment, while disapproval may indicate that a user generally disagreed with the segment. In this example, the statistics 132(1) indicate that the first segment 130(1) has a 58% approval rating (and/or has a 42% disapproval rating).

As described above, the content provider 106 may be configured with one or more rules that determine when the content provider 106 should indicate broad approval and/or disapproval of individual segments. For instance, the content provider 106 may be configured with a rule stating that the provider 106 should indicate approval if an individual segment has received at least five positive approvals and the overall approval rating is greater than 75%. Another rule may state that the provider 106 should indicate disapproval of a segment has received at least five disapprovals and the approval percentage is less than 25% (or the disapproval rate is greater than 75%). While this example provides one illustrative rule comprising several thresholds, other rules may comprise any other type of one or more thresholds.

Here, the segment 130(1) has received the threshold number of votes for approval (seven total approvals), but has not received the threshold percentage or ratio of approvals to disapprovals. In addition, the segment 130(1) has not met either of the thresholds for classifying the segment 130(1) as having received broad disapproval. As such, the content provider 106 does not indicate either approval or disapproval, as shown in the UI 126. Specifically, the segment 130(1) within the UI 126 includes default settings associated with the corpus of text of the review 118(O).

The statistics 132(2) associated with the segment 130(2), meanwhile, indicate that the second segment 130(2) has received sixteen user approvals and only two disapprovals, for an approval rating of 89%. Here, the segment 130(2) has received the threshold number of approvals, as well as the threshold approval percentage. As such, the content provider 106 may indicate this threshold approval. For instance, as shown in the bottom-right portion of FIG. 1 as well as within the example UI 126, the content provider 106 may alter the text associated with the segment 130(2). Here, the provider sets this text to bold, italicized, oversized lettering. In other instances, the provider 106 may alter a color of the segment 130(2) (e.g., making the segment green), may provide an icon (e.g., a thumbs up) adjacent to the segment, or the like.

To perform the functionality described immediately above, the content provider 106 stores or otherwise has access to a segment-rating module 134. While FIG. 1 illustrates each of the components within this module 134 being stored on or accessible by the provider 106, in some instances some or all of these components may reside on one or more other entities. For instance, some or all of these components may reside on the computing devices 104 in some instances. Furthermore, in some instances, the components shown on the content provider 106 may provide code to the respective computing devices 104 to perform the respective functionality of the component.

As illustrated, the segment-rating module 134 includes a selection component 136, a rating component 138, a calculation component 140, and an indication component 142. The selection component 136 may enable and detect when a user, such as the example user 102(1) selects an individual portion or segment of a discrete piece of content (e.g., the customer review 118(O)). In response, the selection component (or code provided by the selection component 136) may provide an indication of the selection to the rating component 138. In response to receiving this indication that the user 102(1) has selected a particular segment associated with the customer review 118(O), the rating component 138 (or code provided by this component) may cause display of a selectable icon, such as the icon 128, to allow the user 102(1) to express approval or disapproval of the selected segment.

In some instances, the selection component 136 and the rating component 138 reside on the computing device 104(1) for execution by the application 124 (e.g., as a plug-in to the application 124, which may comprise a browser). In this and other instances, these components may comprise scripts, Adobe Flash® multimedia software, or any other type of code that may be executed in real time on the client side. For instance, this code may be implemented in script, that detects when the user 102(1) highlights a particular section of text from within the review 118(O) and, in response, causes display of the icon 128. While this example describes the icon 128 as being displayed in response to a user selection of text or other portion of a piece of content, in other instances, the selectable icon may be output prior to the selection. Furthermore, while this code may execute on the computing device 104(1), in other instances the computing device may make calls to the content provider 106. For instance, the techniques may be implemented via Asynchronous JavaScript and XML (AJAX) or via any other client/server protocols.

After the user 102(1) provides a rating to a particular segment of the customer review 118(O), the computing device 104(1) may provide an indication of this rating to the content provider 106. In response, the calculation component 140 may store this approval or disapproval in association with the selected segment. The calculation component 140 may also aggregate this received approval/disapproval with other previously-received approval/disapprovals associated with this segment (e.g., word, sentence, etc.). In addition, the calculation component 140 may compare these aggregated indications to one or more thresholds 144 to determine whether the selected passage has reached threshold approval or disapproval.

If the segment rated by the user has reached the threshold(s) 144, then the indication component 142 may indicate this approval or disapproval on the UI 126 in response to other users 102 requesting the UI 126. Furthermore, the indication component 142 may, in some instances, indicate this approval or disapproval on the UI 126 rendered by the application 124 of the user 102(1), since the user 102(1) has herself approved or disapproved of the selected segment. As with the components described above, the indication component 142 may comprise code executable on the computing device 104(1) and/or the content provider 106.

Example User Interfaces (UIs)

Figure 2A:
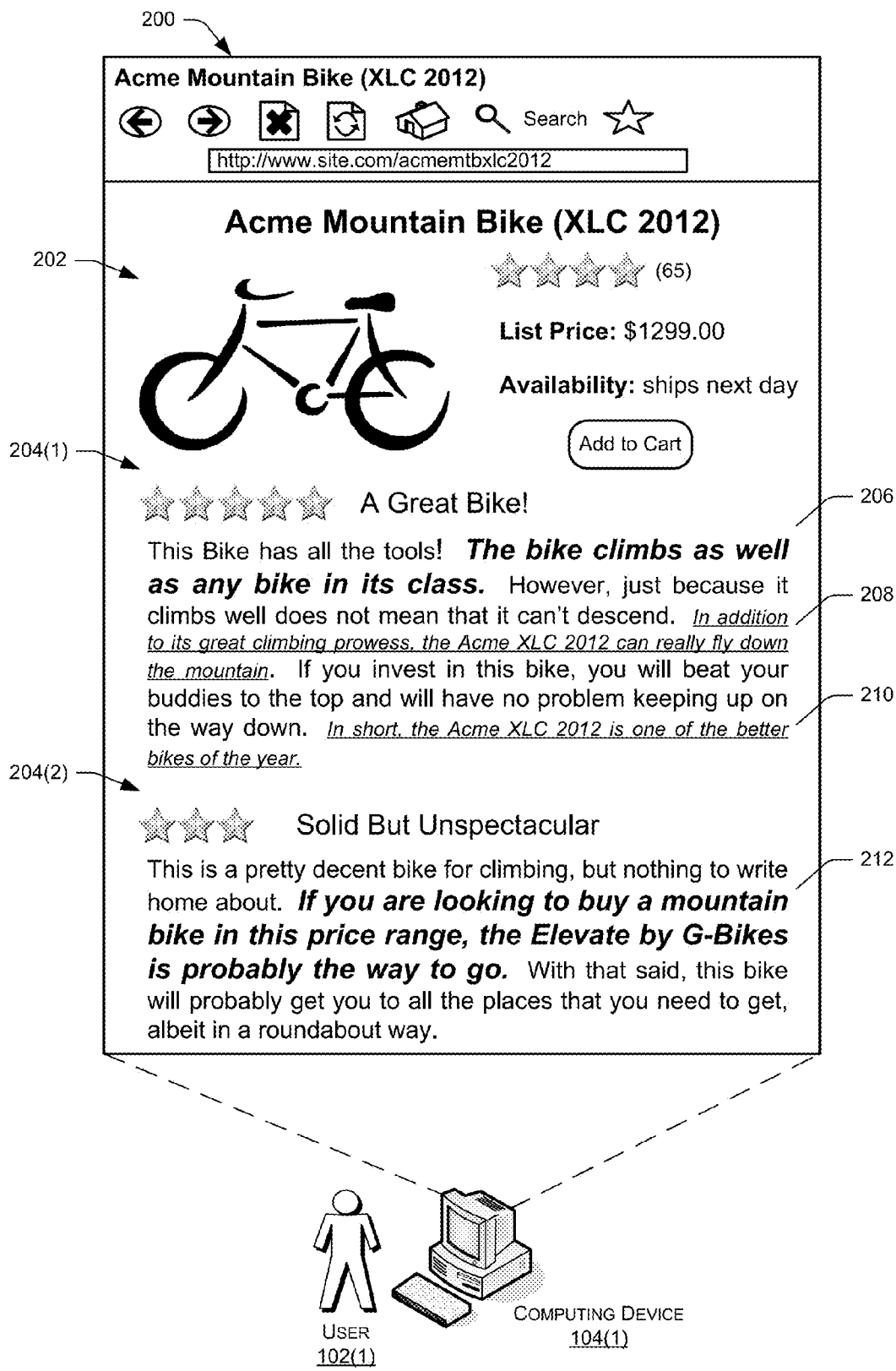
FIG. 2A is a screen rendering of an example user interface (UI) that includes customer reviews. As illustrated, these customer reviews indicate (in bold, italics, and oversized lettering) segments of the reviews that have received positive feedback. These reviews also indicate (in underlined, italics, and undersized lettering) segments of the review that have received negative feedback.

FIG. 2A is a screen rendering of an example user interface (UI) 200 that includes customer reviews. As illustrated, these customer reviews indicate (in bold, italics, and oversized lettering) segments of the reviews that have received positive feedback. These reviews also indicate (in underlined, italics, and undersized lettering) segments of the review that have received negative feedback. While the example UI 200 comprises a web page in this example, in other instances the UI 200 may be rendered for local applications or in any other context.

The UI 200 includes example details 202 regarding the illustrated bicycle, as well as example customer reviews 204 (1) and 204(2). The details 202 include a name of the item, an image or the item, an overall rating of the item, a price of the item, an availability of the item, and a selectable icon that allows the user 102(1) to add the item to a virtual shopping cart of the user. Of course, while a few example item details have been listed, other UIs may include more or less details.

The customer reviews 204(1) and 204(2), meanwhile, here comprise respective corpuses of text comprising multiple individual segments or portions. The segments may comprise words, sentences, or any other portion of text of the reviews. Some of these individual segments include indications that the respective segment has received a threshold amount of positive feedback or a threshold amount of negative feedback. For instance, these segments may have received a threshold number and/or ratio of approvals and a threshold number and/or ratio of disapprovals. These approvals and disapprovals may have been provided by selection of a thumbs up icon or a thumbs down icon, respectively, or these approvals and disapprovals may represent that the average user rating for these segments is greater or less than a particular threshold. For instance, a segment indicated as having been approved may have received a rating that is, on average, four stars or greater. A segment indicated as having been disapproved may have received a rating that is, on average, two stars or less.

Here, for instance, the customer review 204(1) visually indicates that the following segment 206 has received broad approval: "[t]he bike climbs as well as any bike in its class". As such, the user 102(1) is able to see that the user community 102 broadly accepts this assertion as true. Conversely, the customer review 204(1) indicates that the following two segments 208 and 210 have received broad disapproval: "[i]n addition to its great climbing prowess, the Acme XLC 2012 can really fly down the mountain", and "[i]n short, the Acme XLC 2012 is one of the better bikes of the year". By enabling users to approve or disapprove of individual segments of a customer review in this manner, the user 102(1) is able to better understand which individual portions of a review the community generally supports and which individual portions the community generally disagrees with.

The second customer review 204(2), meanwhile, indicates that the following segment 212 has also received broad approval from the user community: "[i]f you are looking to buy a mountain bike in this price range, the Elevate by G-Bikes is probably the way to go". Again, the user 102(1) is accordingly able to pinpoint the exact segment(s) of the review 204(2) that the user community believes is accurate or otherwise approves of. Again while the example UI 200 indicates approval and disapproval of individual segments in one particular manner, other embodiments may indicate this approval and disapproval in any other way.

In some embodiments, the indicated approvals and/or disapprovals may vary among users. For instance, the provider 106 may take into account information associated with the viewing user (here, the user 102(1)) when determining which approvals and/or disapprovals to indicate. For instance, as opposed to or in addition to comparing segment ratings to a threshold, the UI 200 may indicate approvals and/or disapprovals from social networking contacts of the user 102(1). That is, the content provider 106 may identify social networking or other types of contacts associated with the user 102(1), may determine whether any of these contacts have provided a rating of a segment illustrated in the UI 200, and may visually (or otherwise) indicate these ratings or may weight these ratings more heavily when determining which ratings to indicate on the UI 200.

The content provider 106 may additionally or alternatively take into account any other type of information association with the user 102(1). For instance, the content provider 106 may identify preferences of the user (e.g., political leanings, sports interests, etc.) for the purpose of identifying users with similar preferences that have previously provided a rating of a segment within the UI 200. The provider 106 may then weight these ratings more heavily. Additionally or alternatively, the content provider may take into account a purchase or browsing history of the user 102(1), a geographic location of the user 102(1), and/or any other information associated with the user 102(1) when determining which segments to visually indicate as approved and/or disapproved.

Furthermore, while the example UI 200 illustrates segments as comprising sentences, these segments may comprise varying lengths in some instances. For instance, when users are able to select and provide feedback for segments of their choosing (i.e., are able to select segments of any length), each word of the customer review may be associated with approval/disapproval statistics, as discussed above with reference to FIG. 1. Therefore, each word may be compared to a threshold to determine whether or not that word should be indicated as having broad approval or broad disapproval. In other instances, meanwhile, the UI 200 may fix the size of the segments. For instance, the UI 200 may require that users rate sentences as a whole. This technique ensures that users will provide feedback to consistently-sized segments.

Figure 2B:
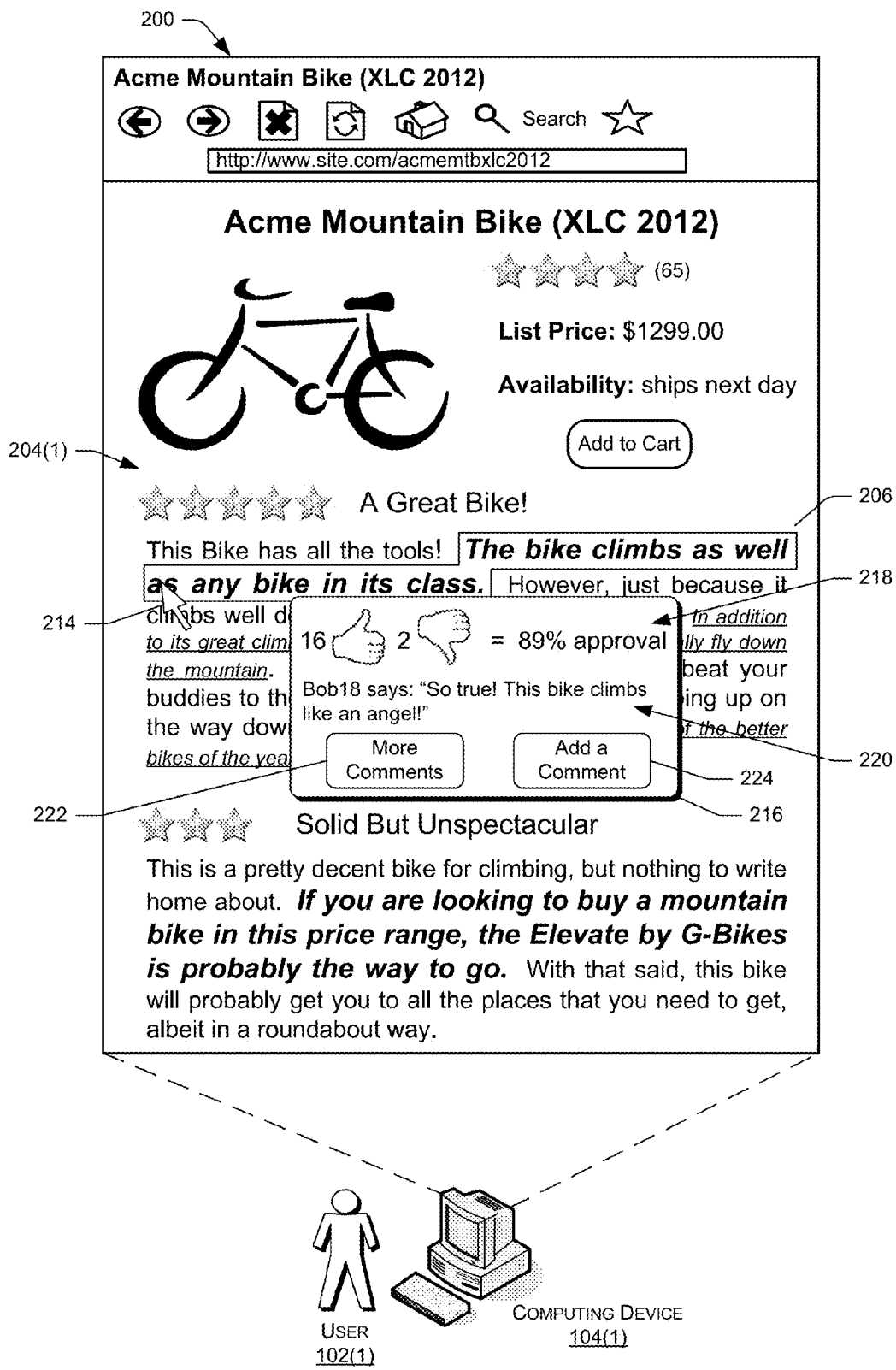
FIG. 2B depicts the UI from FIG. 2A after the user hovers over a segment of the review with a cursor. As illustrated, the UI displays details associated with the feedback of the segment.

FIG. 2B depicts the UI 200 after the user 102(1) hovers over the segment 206 of the review 204(1) with a cursor 214. As illustrated, the UI 200 displays details 216 associated with the feedback of the segment 206. In this example, these details 216 includes statistics 218 associated with the feedback. While these statistics comprise a total number of approvals and disapprovals, and a ratio thereof, in other instances these statistics 218 may comprise an average rating of the segment 206 (e.g., "4.2 stars") or some other indication of the feedback associated with the segment 206.

In addition, in this example the details 216 comprise an example comment 220 that another user ("Bob 18") has made about the segment 206. The example details 216 also include icons 222 and 224 that are selectable, respectively, by the user 102(1) to view additional comments associated with the segment 206 and to provide an additional comment by the user 102(1). While a few example details 216 have been illustrated, it is to be appreciated that other embodiments may utilize more, fewer, and/or different details than illustrated in FIG. 2B. Furthermore, the user 102(1) may select to view these details in any other manner other than simply hovering over the segment 206 with the cursor 214.

In some instances, the comments, statistics, or other information within the details 216 may be tailored to the user 102(1), similar to the discussion above regarding tailoring the visual indications of segment approval and disapproval. For instance, the provider 106 may identify social networking contacts of the user 102(1), a geographical location of the user, a purchase or browsing history of the user, or any other information associated with the user to tailor the information within the details 216. In this example, for instance, the user "Bob18" may be a social networking contact of the user 102(1).

FIGS. 3A-3D, meanwhile, depict a series of example screen renderings of the UI 200 as the user 102(1) selects and approves or disapproves of a particular segment of a piece of content. Here, the user 102(1) selects a particular segment 302 from within the review 204(1) by highlighting the segment 302 with a cursor 304. While the user 102(1) selects the segment 302 by highlighting the segment 302 in this example, in other instances the user 102(1) may select the segment in any other manner.

Figure 3A:
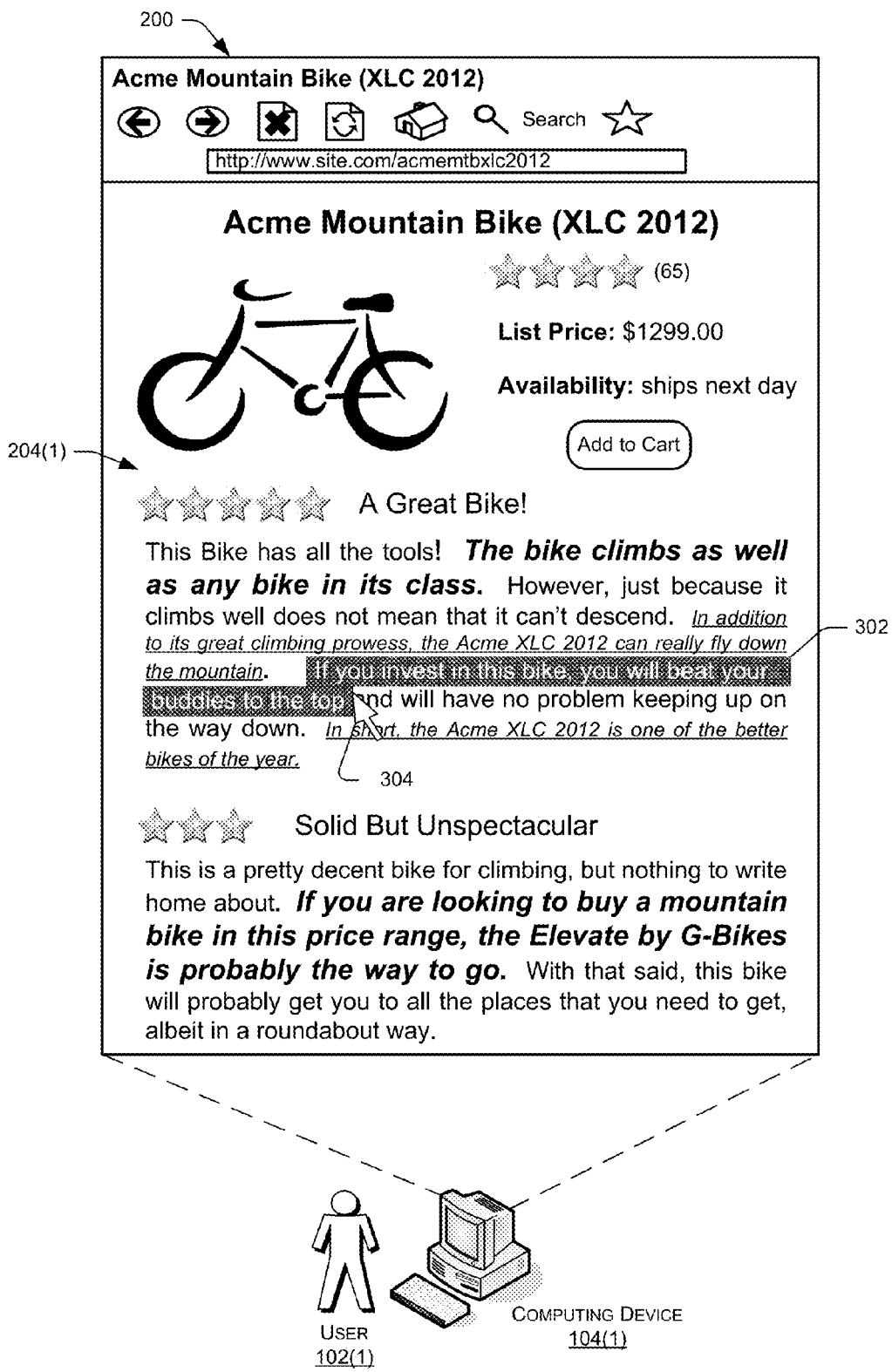
FIGS. 3A-3D depict a user selecting a segment of a piece of content (here, a review), as well as the example UI surfacing an icon that enables the user to express approval or disapproval of the selected segment. The example UI also indicates the user's approval of the segment responsive to the user expressing an approval of the segment using the surfaced icon.
Figure 3B:
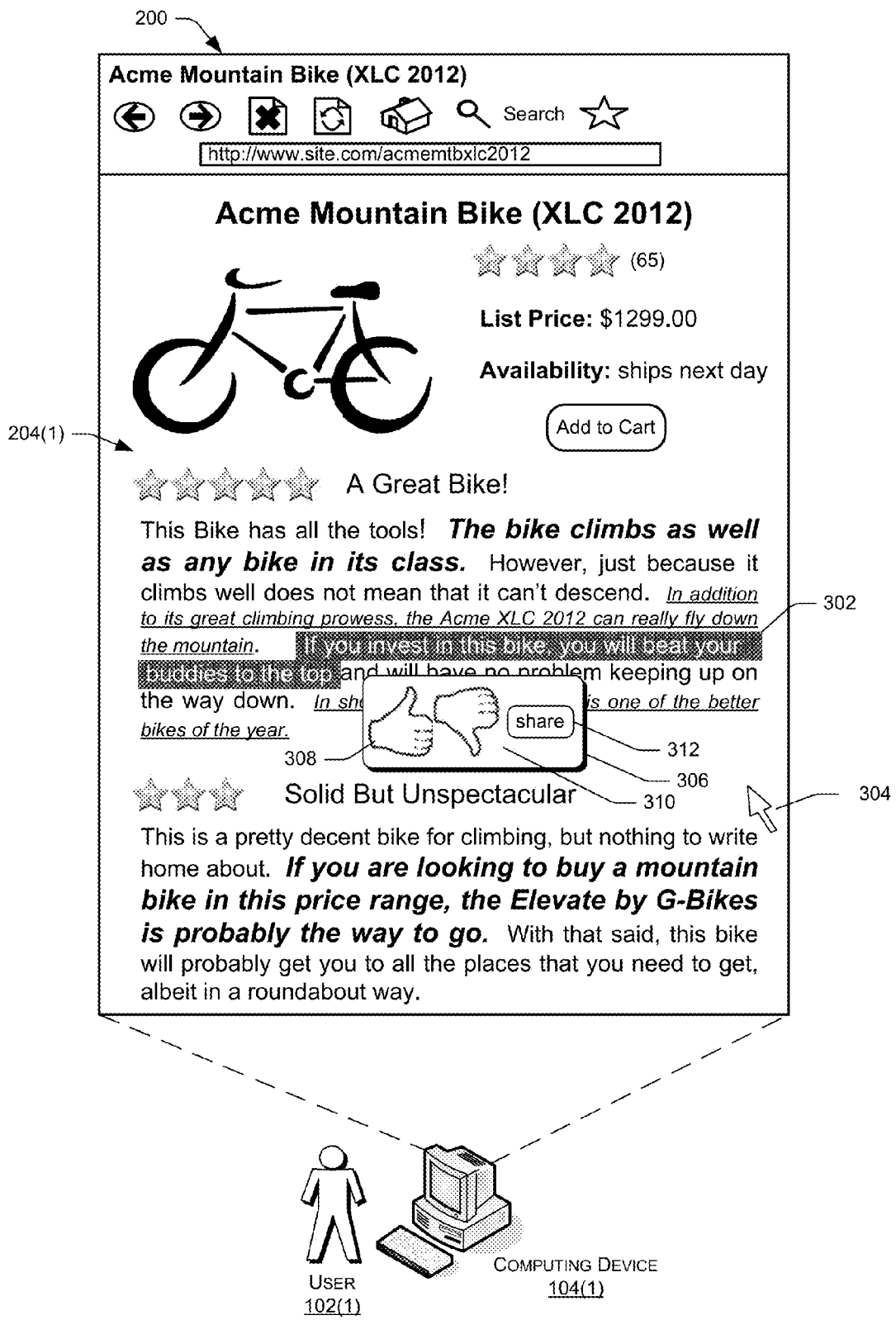

FIG. 3B illustrates the example UI 200 after the user has highlighted the segment 302. As illustrated, in response to the selection the UI 200 has surfaced an interface that allows the user 102(1) to indicate approval or disapproval of the selected segment 302. More specifically, in this example the UI 200 has surfaced an icon 306 that includes a thumbs-up icon 308 and a thumbs-down icon 310. The thumbs-up icon 308 is selectable by the user 102(1) to express an approval of the selected segment, while the thumbs-down icon 310 is selectable by the user 102(1) to express disapproval of the selected segment 302. As described above, in other embodiments the UI 200 may surface another icon that allows the user 102(1) to express approval or disapproval in any other way. For instance, the UI may surface an icon that allows the user 102(1) to rate the selected segment 302 from one star to five stars. Of course, while a few example icons have been described it is to be appreciated that the UI 200 may allow the user 102(1) to express approval or disapproval of the segment 302 in any other way and at any other level of granularity.

Furthermore, in this example the icon 306 includes a "share" icon 312 that, when selected, allows the user 102(1) to share the selected segment 302. For instance, selection of the share icon 312 may cause another icon or text box to pop up that allows the user 102(1) to share this passage with one or more contacts in any way, such as via an email, text message, a social network, or the like. Of course, while this example depicts the example share icon 312, other embodiments may not include this icon.

Figure 3C:
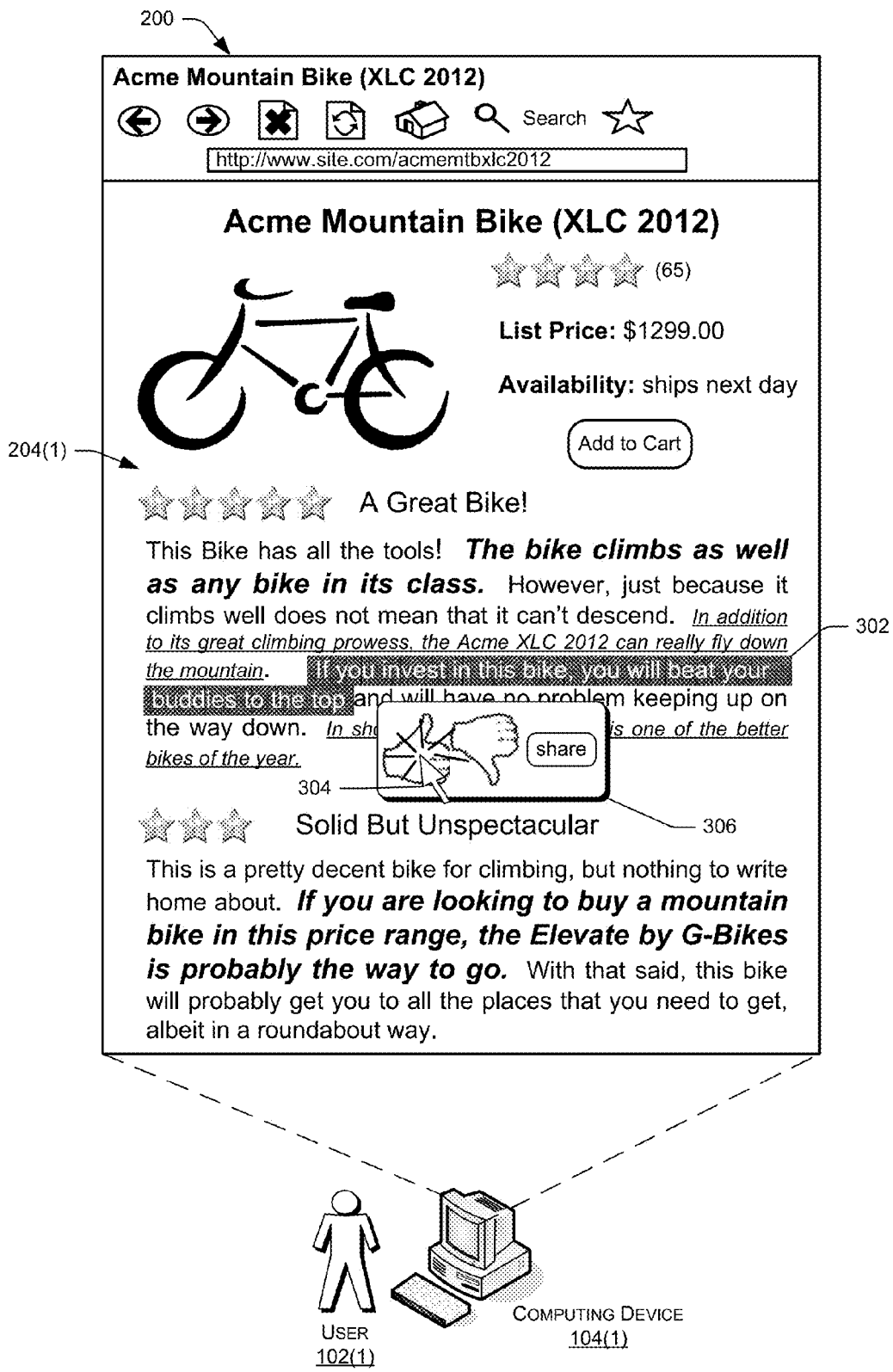

FIG. 3C illustrates the example UI 200 as the user selects the thumbs-up icon 308 of the illustrated icon 306 of FIG. 3B. By doing so, the user 102(1) express an approval for the segment 302 stating that "[i]f you buy this bike, you will beat your buddies to the top". As shown in the illustration, this segment comprises an amount of text that is less than the entire sentence and less than the entire review 204(1).

Figure 3D:
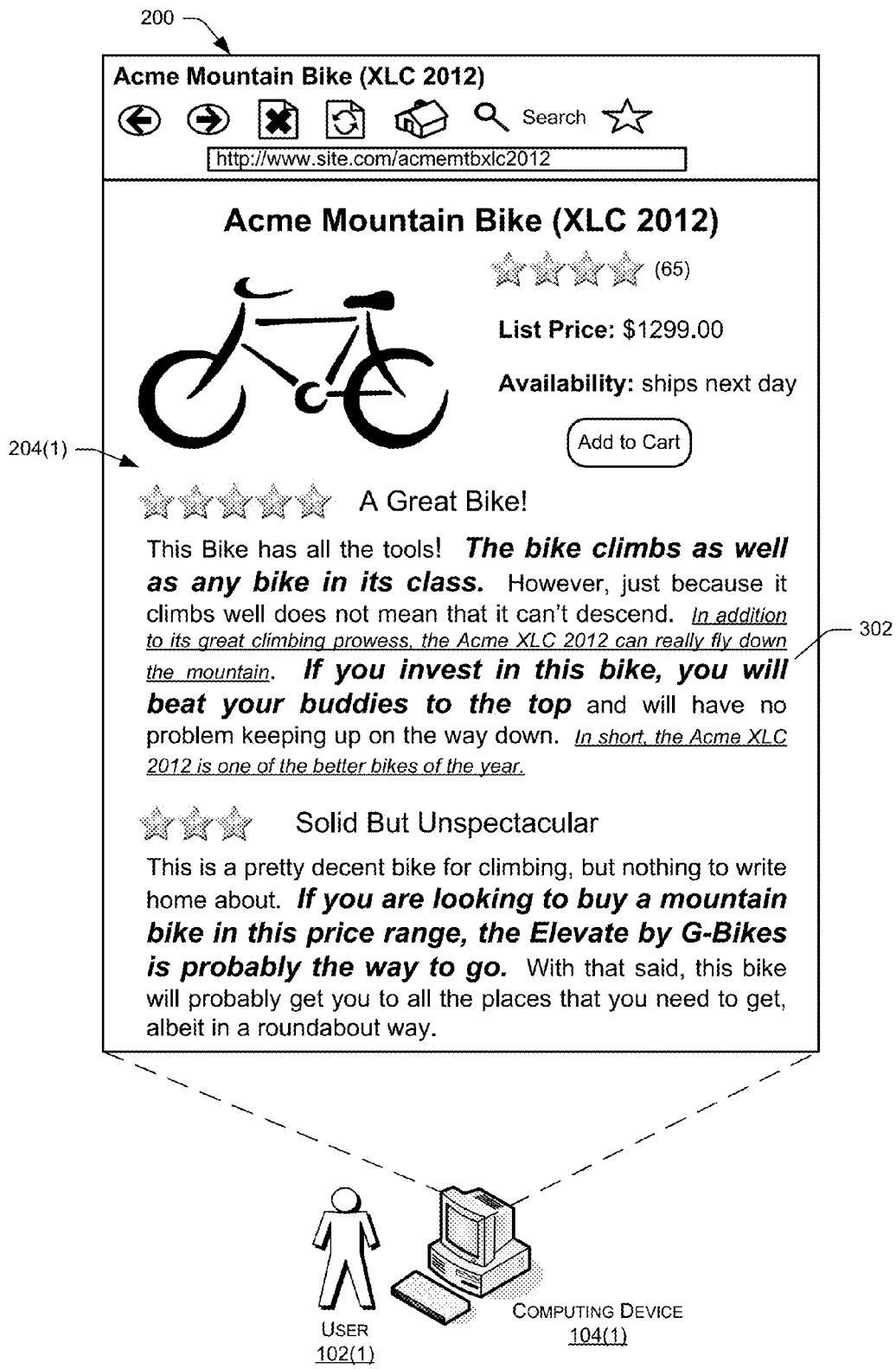

Finally, FIG. 3D illustrates the example UI 200 after the user selects the thumbs-up icon 308. In this example, the UI 200 indicates that the user 102(1) has approved the segment 302 based on the user's selection. In this instance, the UI 200 surfaced to the user 102(1) indicates this approval even if the segment 302 has not met a community threshold for approval, since the user 102(1) has herself provided the approval. In other instances, meanwhile, the UI 200 may refrain from indicating the approval unless the segment 302 has met the approval threshold, after aggregating the approval from the user with other previously-received approvals.

Furthermore, in some instances the user 102(1) may employ the described icon 306 (or other icons described herein) to alter a rating of a segment, such as the segment 302. For instance, sometime after the user 102(1) has provided an approval of the segment 302 via the selection illustrated in FIG. 3C, the user 102(1) may again highlight some or the entire segment for the purpose of altering the user's rating of this segment. For example, if the user highlights the segment 302 and then selects the thumbs down icon 310, the user's rating of this segment may change from "approved" to "neutral", or from "approved" to "disapproved". Further, the UI 200 may accordingly alter the indications associated with the segment 302. For instance, the UI 200 may remove the illustrated bold and italics to indicate a neutral rating, or the UI 200 may underline and make the text of the segment 302 smaller, indicating the disapproval of the segment 302. Of course, while one example has been given, it is to be appreciated that the user 102(1) can alter the user's rating in any other suitable manner.

Figure 4:
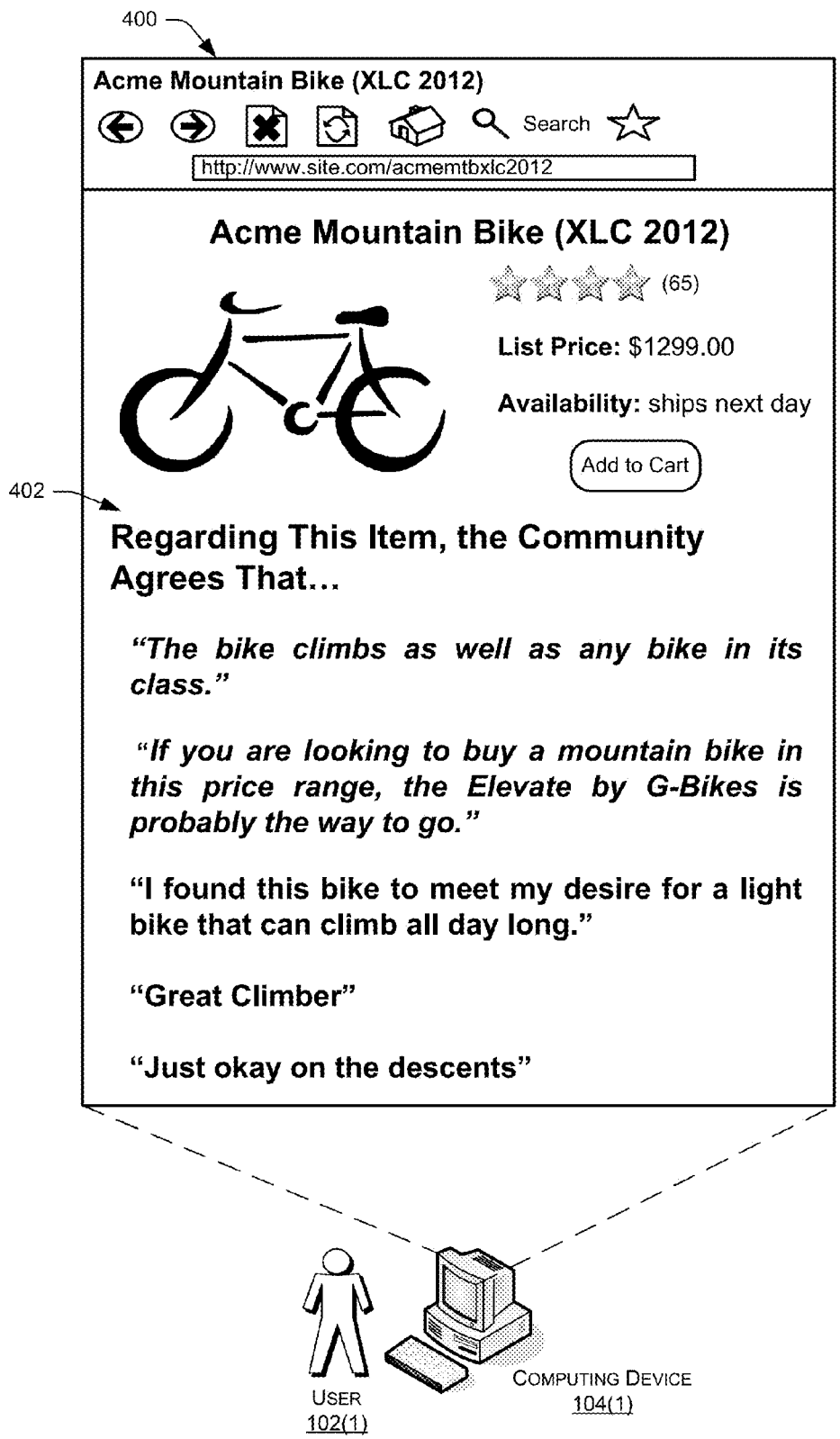
FIG. 4 is a screen rendering of another example UI. Here, the UI comprises a compilation of segments from customer reviews that have received a threshold level of approval.

FIG. 4 is a screen rendering of another example UI 400. Here, the UI 400 comprises a compilation of segments 402 from customer reviews that have received a threshold level of approval. For instance, the calculation component 140 of the content provider 106 may identify which segments from customer reviews associated with the illustrated item (here, the bicycle) have received the highest levels of approval. This may be based on a total number of approvals a segment has received, a total number of unique users that provided an approval for a segment, a ratio of approvals to disapprovals for a segment, and/or any other criteria.

After identifying and ranking the most-approved segments, the UI 400 may surface these segments as a compilation 402. This compilation may display a segment having a highest approval ranking first, and so forth. By doing so, the UI 400 allows the user 102(1) to quickly view those segments of reviews that the user community most broadly agrees with. While this figure illustrates a compilation of most-approved segments, the techniques may similarly implement a compilation of most-disapproved segments, or may implement a compilation of most-approved and most-disapproved segments. Furthermore, the compilation 402 and/or other compilations may be tailored to the user 102(1) in some instances, based on preferences of the user 102(1), a purchase history of the user 102(1), and/or the like.

Figure 5A:
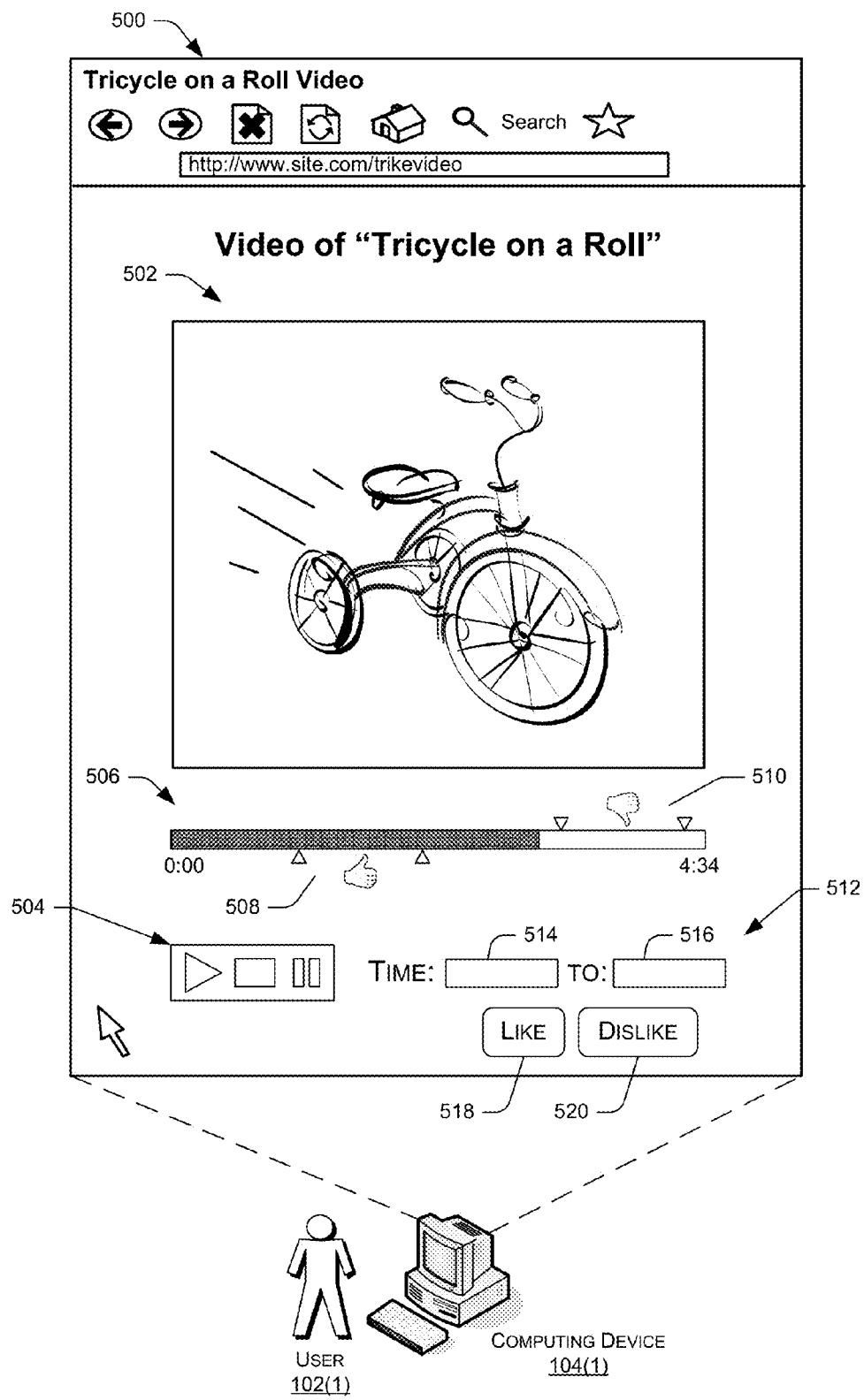
FIGS. 5A-5B illustrate the described techniques in the context of video content. Here, an example screen rendering of the UI includes a video, indications of portions of the video where other users have expressed approval or disapproval, and an interface that allows the user to express approval or disapproval of individual portions of the video.
Figure 5B:
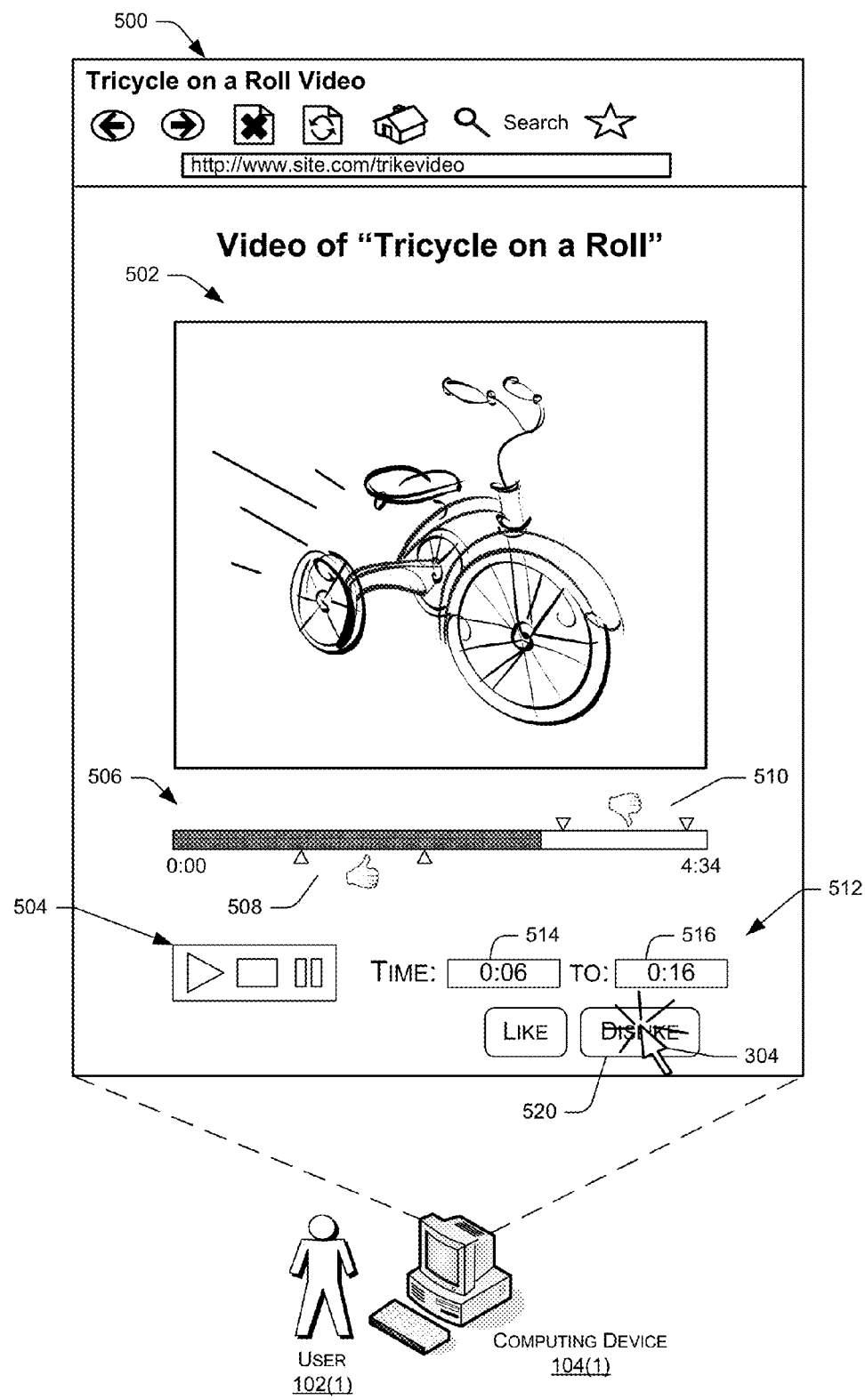

FIGS. 5A-5B illustrate the described techniques in the context of video content. Here, an example UI 500 includes a video 502 being rendered by the computing device 104(1). The UI 500 also includes video player controls 504 and a playback bar 506 indicating the length of the video and a current location of the playback of the video 502. In addition, the playback bar 506 indicates a segment 508 of the video 502 that the user community 102 has broadly approved, as well as a segment 510 where the user community 102 has broadly disapproved. Similar to the discussion above, these segments 508 and 510 may have achieved levels of approval and disapproval, respectively, which are greater than predefined thresholds.

Also similar to the discussion above regarding customer reviews and other corpuses of text (e.g., news articles, social networking statuses, etc.), the indications on the playback bar 506 help the user 102(1) to understand which segments of the content (here, the video) have been generally approved and which have been generally disapproved. Furthermore, while the approved and disapproved segments are indicated on the playback bar 506 in the illustrated example, the techniques may indicate these segments in any other manner in other instances.

In addition to indicating previously-approved and/or disapproved segments, the UI 500 includes an interface 512 that allows the user 102(1) to voice her own approval or disapproval of segments of the video 502. The interface may allow the user 102(1) to provide this approval or disapproval in any way (e.g., orally, via a graphical user interface (GUI), etc.). In this example, the interface 512 allows the user 102(1) to specify a particular segment of time of the video, and then to indicate whether the user 102(1) approves of (i.e., "likes") or disapproves of (i.e., "dislikes") the specified segment.

More specifically, the illustrated interface 512 includes a text box 514 that allows the user 102(1) to input a start time of the segment and a text box 516 that allows the user 102(1) to input an end time of the segment. In addition, the interface 512 includes an icon 518 entitled "like" that allows the user 102(1) to voice an approval of the specified segment, and an icon 520 entitled "dislike" that allows the user 102(1) to voice disapproval of the specified segment.

FIG. 5B illustrates the UI 500 after the user 102(1) has specified a particular segment of the video using the text boxes 514 and 516. Specifically, the user 102(1) has specified a ten-second segment of the video 502 beginning at 0:06 and ending at 0:16. In addition, FIG. 5B illustrates the user 102(1) selecting the dislike icon 520. After selecting this icon, the UI 500 may indicate this disapproval on the playback bar 506 between six seconds and sixteen seconds, similar to the indications 508 and 510. In other instances and as discussed above, however, the UI 500 may refrain from indicating the disapproval of the user 102(1) unless the aggregated disapprovals for this segment (or some segment therein) exceeds a predefined threshold.

Figure 6A:
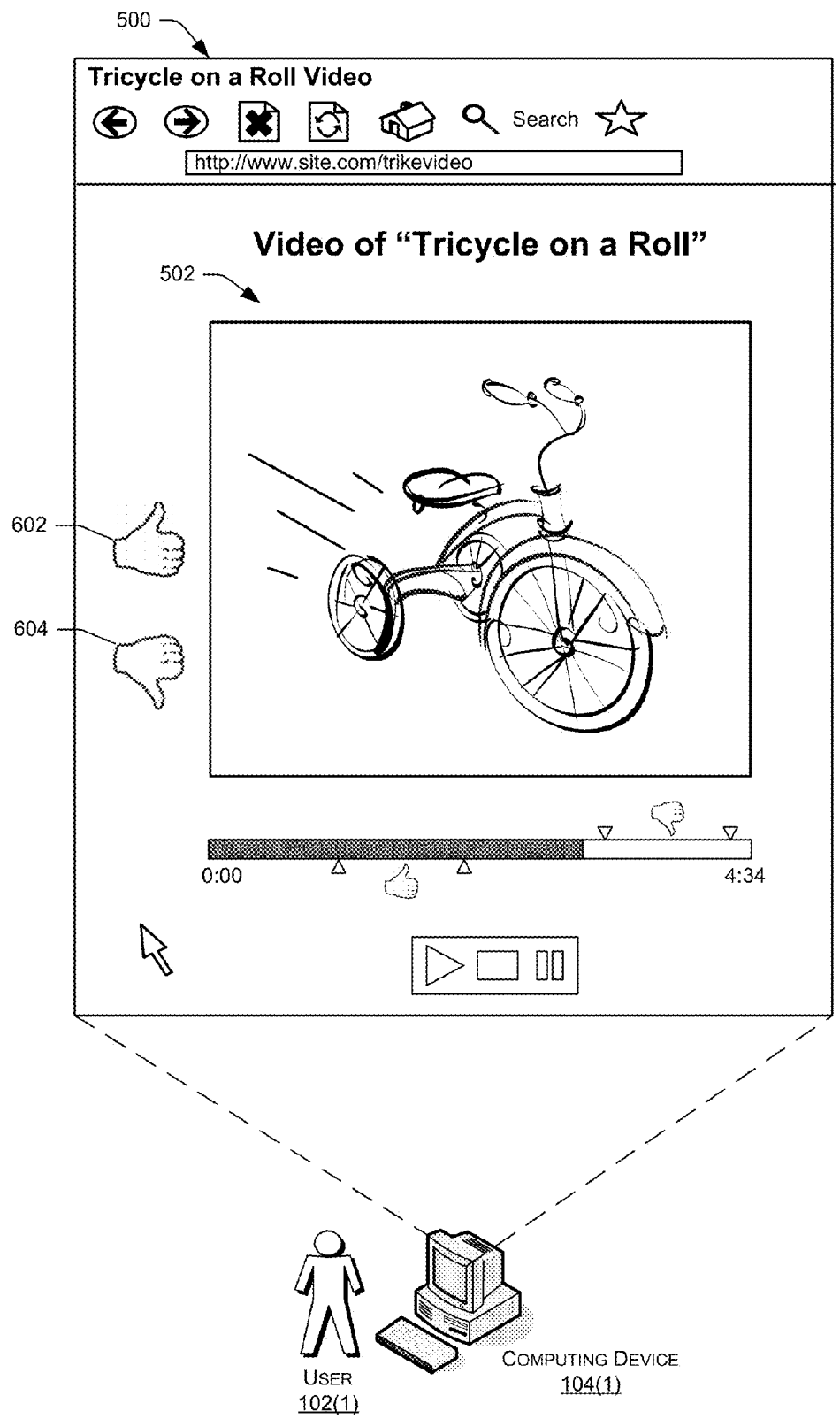
FIGS. 6A-6B illustrate an alternative embodiment for allowing the user to express approval or disapproval of individual portions of the example video.
Figure 6B:
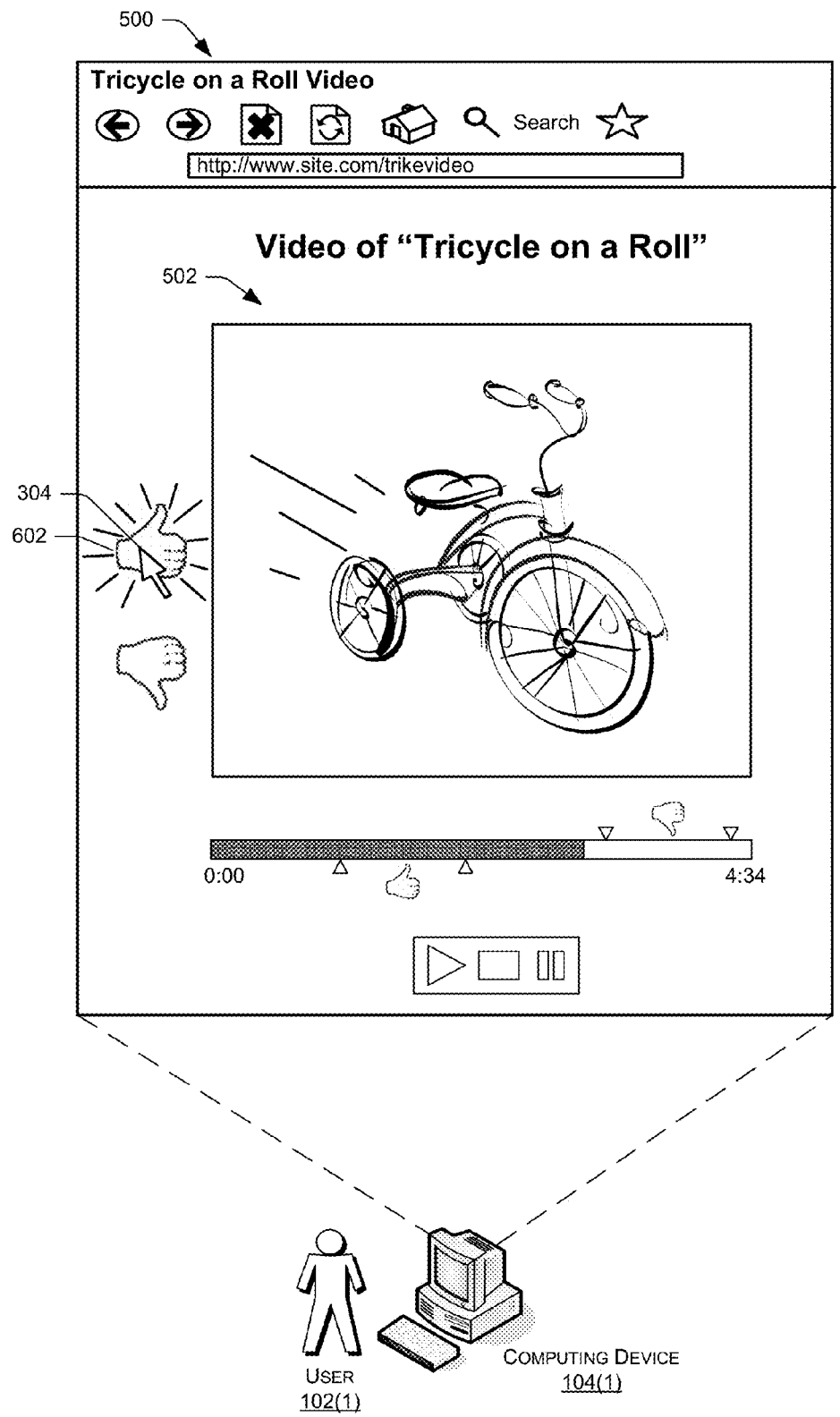

FIGS. 6A-6B illustrate an alternative embodiment for allowing the user to express approval or disapproval of individual portions of the example video 502. FIG. 6A, for instance, illustrates that the example UI 500 may include a thumbs-up icon 602 and a thumbs-down icon 604. In order to express an approval or disapproval of a segment of the video 502, the user 102(1) may select a corresponding one of the icons 602 and 604. In some instances, the UI 500 may allow the user 102(1) to select one of the icons to begin approving or disapproving of a segment, and then select the icon again to end the approval or disapproval. In other instances, meanwhile, the UI 500 may only approve or disapprove of segments when the user 102(1) selects and continuously holds a corresponding icon.

FIG. 6B illustrates the example UI 500 where the user 102(1) selects and holds the icon 602 to begin approving of a segment. This approval will be associated with a segment defined between a time when the user 102(1) initially selects the icon 602 and a time when the user "releases" the icon 602. This technique may be helpful to avoid the situation where users begin approving or disapproving of a particular segment, but forget or otherwise neglect to toggle off the icon to end the approval or disapproval.

While a few example techniques have been described for enabling the user 102(1) to approve or disapprove of particular segments of the video 502, any other similar or different techniques may be utilized. Further, while the above examples have described customer reviews and videos in detail, the described techniques may apply to any number of different discrete pieces of content. For instance, users may approve or disapprove of individual segments of a social networking status, individual segments of an image, individual segments of a song, and/or individual segments of any other type of discrete pieces of content.

Example Processes

Figure 7:
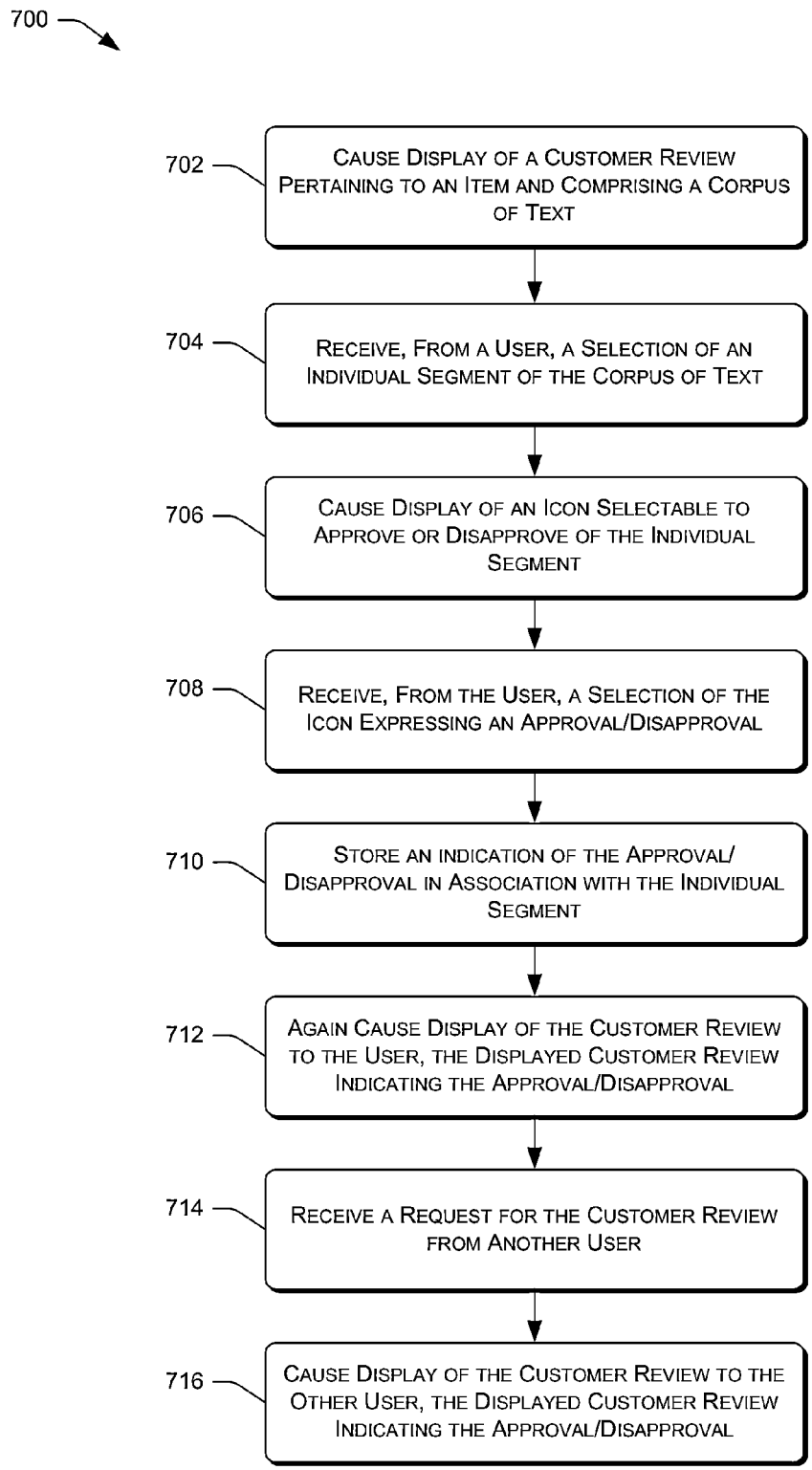
FIGS. 7-9 are flow diagrams of example processes for facilitating approval or disapproval of individual segments found within discrete pieces of content.
Figure 8:
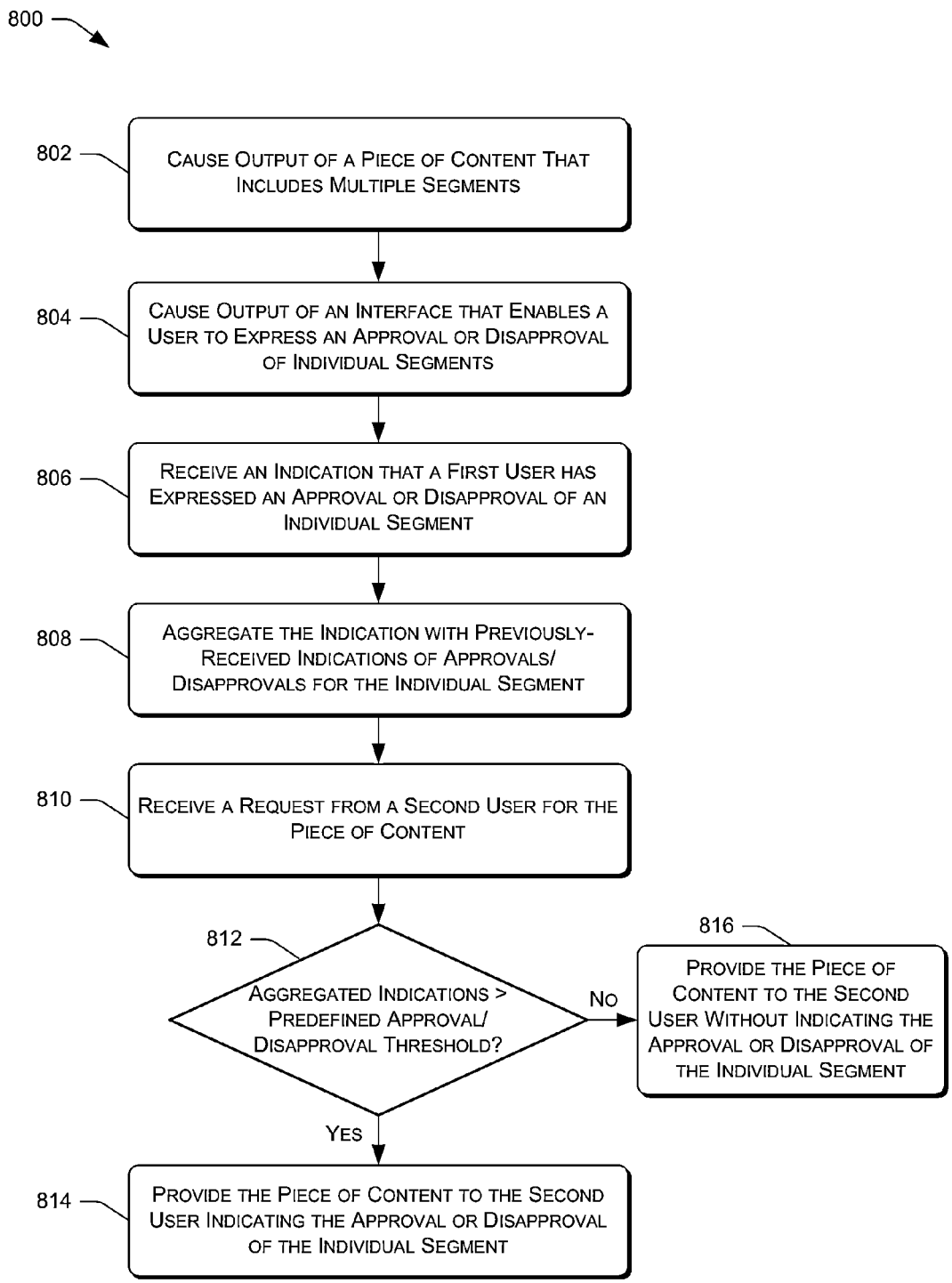
Figure 9:
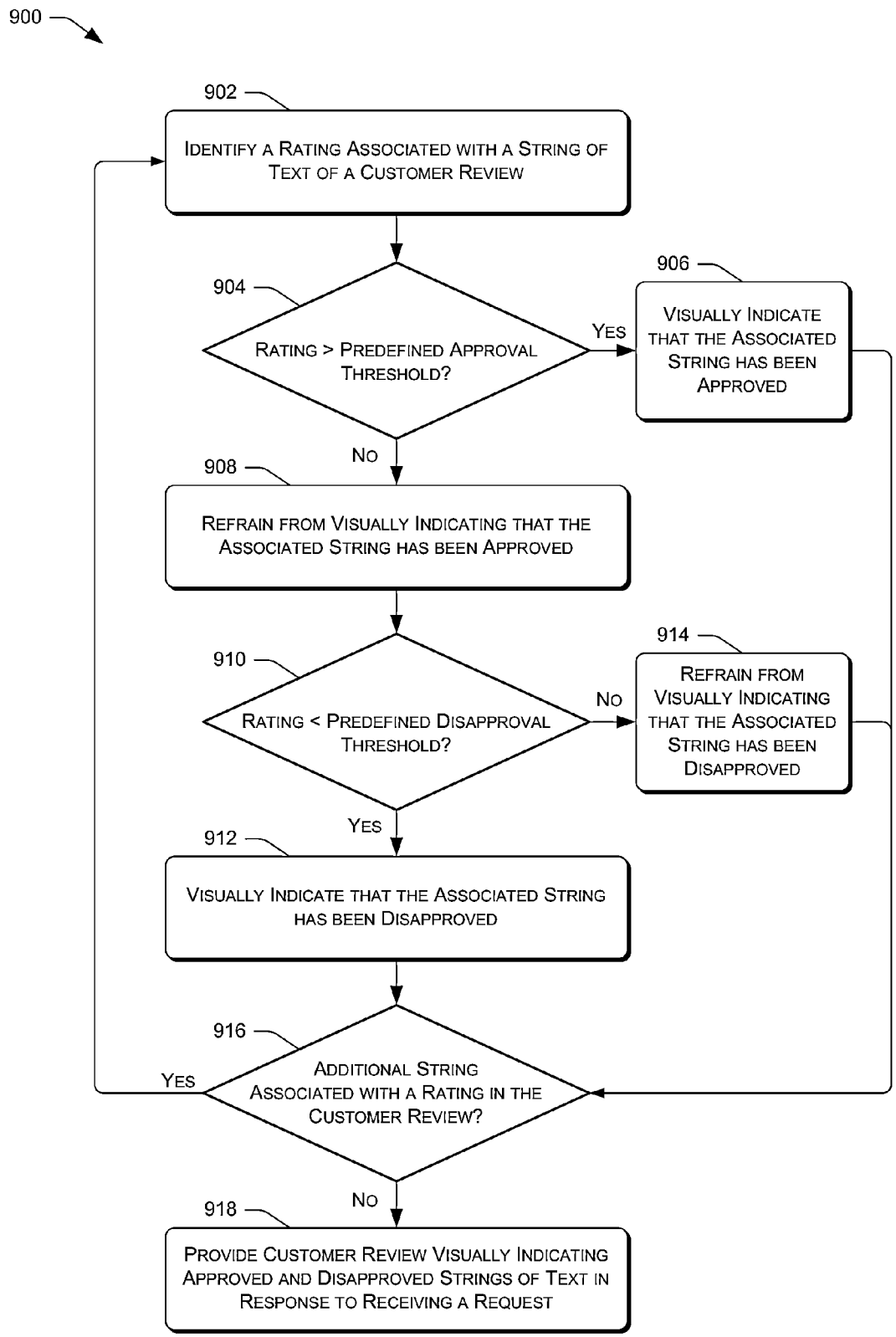

FIGS. 7-9 are flow diagrams of example processes 700, 800, and 900 for facilitating approval or disapproval of individual segments found within discrete pieces of content. Each of these processes is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

The process 700 includes, at operation 702, causing display of a customer review pertaining to an item and comprising a corpus of text. For instance, the content provider 106 may serve a user interfaces that includes the customer review in response to a user request. Operation 704 then receives, from the user, a selection of an individual segment of the corpus of text. For instance, the user may highlight or otherwise select a segment of text that is less than the entire corpus.

An operation 706 then causes display of an icon that is selectable by the user to approve or disapprove of the selected individual segment. In some instances, script on the client device (provided via the selection component 136) may cause display of the icon in response to the user's selection. An operation 708 then receives, from the user, a selection of the icon expressing the user's approval or disapproval of the segment. Again, script on the client device (provided via the rating component 138) may receive this selection of the icon.

An operation 710 then stores an indication of the approval or disapproval in association with the individual segment. For instance, the calculation component 140 of the content provider 106 may store this approval or disapproval and may aggregate the indication with previously-received approvals or disapprovals.

An operation 712 then again causes display of the customer review to the user. For instance, after the user provides the approval or disapproval, the content provider 106 or the client device of the user may refresh the display of the user interface including the customer review. Conversely, the user may again request a user interface including the customer review at later time. In either instance, the again displayed customer review may indicate (e.g., visually, audibly, tactilely, etc.) the approval or the disapproval. In one example, the customer review may format the text of the segment in green if the user provided an approval, and in red if the user disapproved of the segment.

Sometime after receiving the approval or disapproval from the user, an operation 714 receives a request for the customer review from another user. For instance, the content provider 106 may receive a request for a user interface (e.g., a web page) that includes the customer review. In response, an operation 716 causes display of the customer review that indicates the previously-received approval or disapproval. For instance, the content provider 106 may serve a user interface that includes an approval in green text and/or a received disapproval in red text. In some instances, the content provider indicates these approvals and/or disapprovals in response to the individual segments of text meeting a corresponding predefined threshold, as described above.

FIG. 8 illustrates the process 800, which includes, at operation 802, causing output of a piece of content that includes multiple segments. This content may comprise a corpus of text (e.g., a news article, a blog, a customer review, etc.), a video, an audio file, and/or any other discrete piece of content. An operation 804 then causes output of an interface that enables a user to express an approval or a disapproval of (or, in other words, rate) individuals segments of the piece of content. For instance, the selection component 136 (or code provided thereby) may output a selectable icon or another type of graphical user interface (GUI) that allows a user to express approval of an individual segment and/or disapproval of an individual segment. For instance, the GUI may allow the user to rate the individual segments by selecting from a binary icon that allows the user to express approval of the respective segment or disapproval of the respective segment (e.g., via a thumbs up and a thumbs down icon). In other instances, the GUI may allow the user to rate the individual segments from a relatively low rating expressing disapproval of the respective segment (e.g., one star) to a relatively high rating expressing approval of the respective segment (e.g., five stars). In other instances, meanwhile, the interface may allow the user to express approval or disapproval of the segment orally, or in any other manner.

An operation 806 then receives an indication that a first user has expressed an approval or a disapproval of an individual segment. For instance, the calculation component 140 of the content provider 106 may receive this indication. In response, the calculation component 140 may aggregate the received indication with previously-received indications of approvals and/or disapprovals for the individual segment at operation 808.

An operation 810 then receives a request from a second user for the piece of content. Again, the content provider 106 may receive this request in some instances. The calculation component 140 may then compare the aggregated approvals and/or disapprovals to one or more predefined thresholds to determine whether the segment meets the threshold at operation 812. If so, then the indication component 142 of the content provider 106 may provide an indication to this segment and the provider 106 may serve the piece of content that includes the indication to the second user at an operation 814. For instance, if the segment meets an approval threshold, then the indication component 142 may cause the segment to be output in green. Conversely, if the segment meets a disapproval threshold, then the indication component 142 may cause the segment to be output in red. If the aggregated approvals do not meet the approval and/or disapproval thresholds, then the content provider 106 may serve the piece of content without indicating an approval or disapproval in association with the segment at an operation 816. For instance, the content provider may serve the piece of content without altering a color, style, or other features of the segment previously-selected by the first user.

FIG. 9 illustrates the process 900 and includes an operation 902 that identifies a rating associated with a string of text of a customer review pertaining to an item. An operation 904 then determines whether or not the rating is greater than a predefined approval threshold. If so, then an operation 906 visually indicates that the string of text associated with the rating has been approved when presenting the customer review to a user. If the rating is less than the threshold, however, then an operation 908 refrains from visually indicating that the string of text associated with the rating has been approved when presenting the customer review to the user.

Next, if the rating is less than the predefined approval threshold, then an operation 910 determines whether or not the rating is less than a predefined disapproval threshold. If so, then an operation 912 visually indicates that the string of text associated with the rating has been disapproved when presenting the customer review to the user. If not, then an operation 914 refrains from visually indicating that the string of text associated with the rating has been disapproved when presenting the customer review to the user.

An operation 916 then determines whether the customer review includes one or more additional strings associated with a rating. If so, then the process 900 repeats for that rating. If not, then an operation 918 represents that the process 900 provides, to a user, the customer review that visually indicates the approved strings of text and the disapproved strings of text in response to receiving a request from the user.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims

What is claimed is:

1. A method comprising:

under control of one or more computer systems configured with specific executable instructions, causing display of a customer review pertaining to an item and comprising a corpus of text;

receiving, from a user, a selection of an individual segment of the corpus of text; and at least partly in response to the receiving of the selection, causing display of an icon that is: (1) selectable to enable the user to express an approval of the individual segment, or (2) selectable to enable the user to express a disapproval of the individual segment.

2. A method as recited in claim 1, wherein the individual segment comprises less than all of the corpus of text.

3. A method as recited in claim 1, wherein the icon is both selectable to enable the user to express an approval of the individual segment and selectable to enable the user to express a disapproval of the individual segment.

4. A method as recited in claim 1, further comprising:

receiving a selection of the icon from the user, the selection expressing an approval of the individual segment; and storing an indication of the approval in association with the individual segment.

5. A method as recited in claim 4, further comprising:

again causing display of the customer review subsequent to the user selecting the icon to express the approval, the displayed customer review visually indicating the approval of the individual segment.

6. A method as recited in claim 1, further comprising:

receiving a selection of the icon from the user, the selection expressing a disapproval of the individual segment; and storing an indication of the disapproval in association with the individual segment.

7. A method as recited in claim 6, further comprising:

again causing display of the customer review subsequent to the user selecting the icon to express the disapproval, the displayed customer review visually indicating the disapproval of the individual segment.

8. A method as recited in claim 1, wherein the user comprises a first user, and further comprising:

receiving a selection of the icon from the user, the selection expressing an approval or disapproval of the individual segment;

storing an indication of the approval or disapproval in association with the individual segment;

receiving a request for the customer review from a second user subsequent to the storing of the indication; and causing display of the customer review to the second user at least partly in response to the receiving of the request, the customer review displayed to the second user visually indicating the approval or the disapproval of the individual segment based at least in part on the stored indication.

9. One or more computer-readable storing instructions that, when executed on one or more processors, cause the one or more processors to perform a method as recited in claim 1.

10. A method comprising:

under control of one or more computer systems configured with specific executable instructions, causing output of a piece of content that includes multiple segments on a computing device of a user; and causing, at least partly in response to a user selection of one or more of the multiple segments of the piece of content, output of an interface on the computing device that enables the user to express an approval of individual ones of the multiple segments or that enables the user to express a disapproval of individual ones of the multiple segments.

11. A method as recited in claim 10, wherein the interface enables the user to express an approval of individual ones of the multiple segments and the interface enables the user to express a disapproval of individual ones of the multiple segments.

12. A method as recited in claim 10, wherein:

the piece of content comprises a corpus of text;

the multiple segments comprise respective portions of the corpus; and the interface is output at least partly in response to the user selecting a particular portion of the corpus.

13. A method as recited in claim 10, wherein:

the piece of content comprises a corpus of text;

the multiple segments comprise respective strings of text of the corpus; and the interface comprises a graphical user interface (GUI) that is output at least partly in response to the user highlighting a particular string of text of the corpus.

14. A method as recited in claim 10, wherein:

the piece of content comprises audio or video;

the multiple segments comprise respective portions of the audio or video; and the interface comprises a graphical user interface (GUI) that enables the user to select respective portions of the audio or video and to express an approval or disapproval of selected respective portions.

15. A method as recited in claim 10, wherein the piece of content output on the computing device of the user indicates an approval or a disapproval of a particular segment of the piece of content based at least in part on the user having previously expressed the approval or the disapproval of the particular segment.

16. A method as recited in claim 10, wherein the piece of content output on the computing device of the user indicates an approval or a disapproval of a particular segment of the piece of content based at least in part on at least one other user having previously expressed the approval or the disapproval of the particular segment.

17. A method as recited in claim 10, wherein the piece of content output on the computing device of the user indicates an approval or a disapproval of a particular segment of the piece of content based at least in part on: (1) a threshold number of other users having previously expressed the approval or the disapproval of the particular segment, or (2) the particular segment having received a threshold ratio of approvals to disapprovals or disapprovals to approvals.

18. One or more computer-readable media storing computer-executable instructions that, when executed on one or more processors, cause the one or more processors to perform a method as recited in claim 10.

19. One or more computer-readable media storing computer-executable instructions that, when executed on one or more processors, cause the one or more processors to perform acts comprising:

presenting, on a computing device of a user, a discrete piece of content comprising multiple segments; and presenting, on the computing device an interface that allows the user of the computing device to rate individual ones of the multiple segments of the discrete piece of content.

20. One or more computer-readable media as recited in claim 19, wherein the interface allows the user to rate the individual ones of the multiple segments from a relatively low rating expressing disapproval of the respective segment to a relatively high rating expressing approval of the respective segment.

21. One or more computer-readable media as recited in claim 19, wherein the interface allows the user to rate the individual ones of the multiple segments by selecting from a binary icon that allows the user to express approval of the respective segment or disapproval of the respective segment.

22. One or more computer-readable media as recited in claim 19, wherein:
- the discrete piece of content comprises a corpus of text;
- the multiple segments comprise portions of the corpus of text; and
- the interface is presented at least partly in response to the user selecting a portion of the corpus of text.

23. One or more computer-readable media as recited in claim 19, wherein:
- the discrete piece of content comprises audio or video;
- the multiple segments comprise respective portions of the audio or video; and
- the interface comprises a graphical user interface (GUI) that enables the user to rate respective portions of the audio or video to express an approval or disapproval of selected respective portions.

* * * * *